United States Patent [19]

Taylor et al.

[11] Patent Number: 5,076,621

[45] Date of Patent: Dec. 31, 1991

[54] CORRAL OR STALL LATCH

[76] Inventors: Colin Taylor, R. R. 1, S. 11, C. 8, Kelowna, British Columbia, Canada, V1Y 7P9; Dennis Thompson, 3723 - 62 Street, Camrose, Alberta, Canada, T4V 3B5

[21] Appl. No.: 636,703

[22] Filed: Jan. 2, 1991

[51] Int. Cl.[5] .............................................. C05C 1/02

[52] U.S. Cl. .................................... 292/183; 292/189; 292/337

[58] Field of Search ............... 292/183, 184, 148, 137, 292/175, 146, 147, 337, 189

[56] References Cited

U.S. PATENT DOCUMENTS

| | | | |
|---|---|---|---|
| 122,496 | 1/1872 | Shepherd | 292/189 |
| 152,009 | 6/1874 | Robinson | 292/175 |
| 161,684 | 4/1875 | Hurd | 292/189 |
| 315,978 | 4/1885 | Turner | 292/188 |
| 375,604 | 12/1887 | Cedarvall | 292/175 |
| 530,862 | 12/1894 | Teed | 292/150 |
| 583,849 | 6/1897 | Eichholtz | 292/144 |
| 611,790 | 10/1898 | Miltier | 292/153 |
| 727,494 | 5/1903 | Thompson | 292/189 |
| 956,086 | 4/1910 | Harrison | 292/175 |
| 1,485,301 | 2/1924 | Sebastian | 292/189 |
| 1,517,447 | 12/1924 | Merz | 292/145 |
| 1,972,201 | 9/1934 | Preston | 292/189 |
| 2,000,839 | 5/1935 | Hanlon | 292/184 |
| 3,419,302 | 12/1968 | Frey et al. | 292/189 |
| 4,109,949 | 8/1978 | Smith | 292/189 |
| 4,687,238 | 8/1987 | Mintz | 292/137 |

FOREIGN PATENT DOCUMENTS

| | | | |
|---|---|---|---|
| 1399811 | 4/1965 | France | 292/189 |
| 614146 | 12/1960 | Italy | 292/147 |
| 1109271 | 4/1968 | United Kingdom | 292/147 |

*Primary Examiner*—Gary L. Smith
*Assistant Examiner*—Darnell Boucher
*Attorney, Agent, or Firm*—Murray E. Thrift; Stanley G. Ade; Adrian D. Battison

[57] ABSTRACT

A gravity latch for a swinging gates such as a corral gate or a gate on a box stall. The latch has a barrel and keeper mounted on the gate and a gate post. They are both rectangular metal tubes and inclined downwardly from the barrel to the gate at an angle of 45°. The barrel and keeper have parallel rows of fastener openings through them to enable the fastening of the barrel and keeper to gates and posts of various types, including wooden and steel corral gates. A bolt for the latch is in the form of a source metal tube that slides along the barrel and the keeper. In the latched condition, it is completely enclosed within the barrel and keeper to prevent opening of the gate by an animal.

14 Claims, 4 Drawing Sheets

CORRAL OR STALL LATCH

FIELD OF THE INVENTION

The present invention relates to locks or latches and more particularly to a gravity lock especially suitable for use with gates of corrals and box stalls.

A lock or latch for use on corral gates and box stalls should be rugged to resist hard treatment. It should also be relatively simple in construction and operation and yet designed to prevent either accidental or deliberate unlatching by animals, especially horses. The latch should be universal in its application insofar as possible so that it can be mounted on various different types of gate.

SUMMARY OF THE INVENTION

The present invention is concerned with a gate lock or latch that has these and other desirable characteristics for use with a corral or box stall.

According to one aspect of the present invention there is provided a gate latch comprising two tubular housings aligned end to end in a latched condition, each housing having a plurality of pairs of aligned fastener openings therethrough, the fastener openings being arranged in two spaced apart rows extending along the housings, a bolt slidable along the housings, the bolt having an overall length not greater than the combined lengths of the housings and a height less than the distance between the spaced apart rows of fastener openings, and stop means projecting from one side of the bolt.

According to another aspect of the present invention there is provided a gravity lock for a swinging panel with a free edge lying adjacent a fixed standard in a closed position of the panel, the lock comprising a barrel mounted on the panel, a keeper mounted on the standard and a bolt slidable in the barrel and keeper between a latched position with the bolt linking the barrel and keeper and an unlatched position with the bolt retracted from the keeper, wherein the barrel and keeper are tubular members mounted on the panel and the standard respectively with the barrel sloping downwardly to the free edge of the panel and the keeper aligned with the barrel, the adjacent ends of the barrel and keeper being mitred and substantially parallel to the free edge of the panel, fastener openings extending through the barrel and the keeper adjacent top and bottom edges thereof, fasteners extending through at least some of the fastener openings for securing the barrel and keeper to the panel and standard respectively.

The barrel and keeper are preferably rectangular metal section that fasten to the face of the gate and the adjacent standard using lag screws, bolts, U-bolts or nails. By fastening the latch to the face of the gate, the clearance between the gate and the standard does not become a factor in the proper mounting of the latch, as would be the case where the latch was designed to fit into the clearance between the gate and the standard.

The bolt is preferably a square metal tube that is enclosed by the outer tubes in a latched condition. When mounted on a gate, the barrel slopes downwardly toward the edge of the gate, so that the bolt will be set by gravity. The use of tubular barrel and keeper housing substantially eliminates any wear on wooden parts of the gate or the adjacent structure as the moving parts of the latch are all metal.

Mitreing the adjacent ends of the barrel and keeper minimizes interference with the gate's operation due to engagement of the gate mounted components with the standard and vice versa. Preferably all of the ends of the barrel, keeper and bolt are all mitred.

BRIEF DESCRIPTIONS OF THE DRAWINGS

In the accompanying drawings, which illustrate an exemplary embodiment of the present invention:

DETAILED DESCRIPTION

Figure 1:
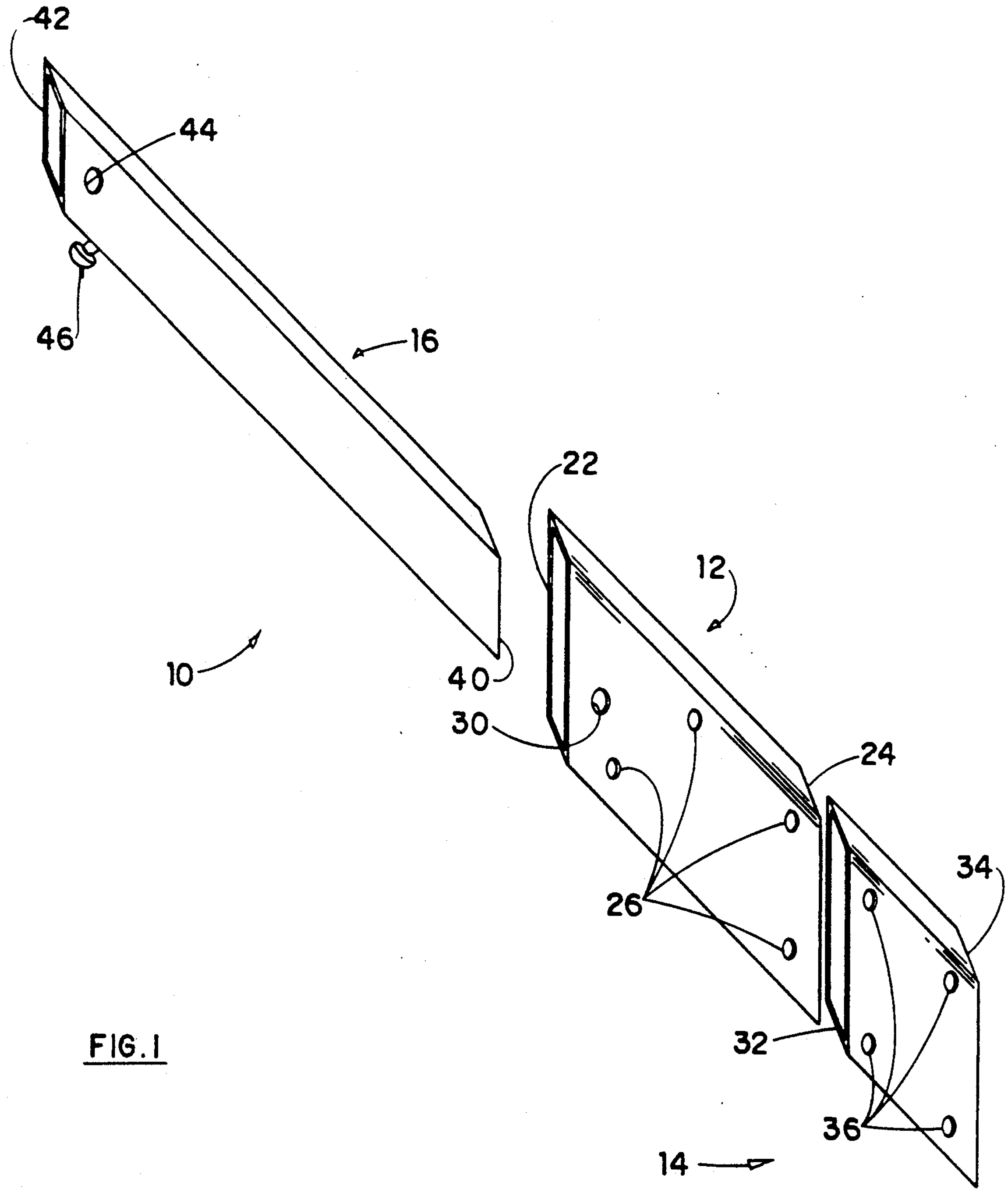
FIG. 1 is an exploded isometric view of the gate latch.
Figure 2:
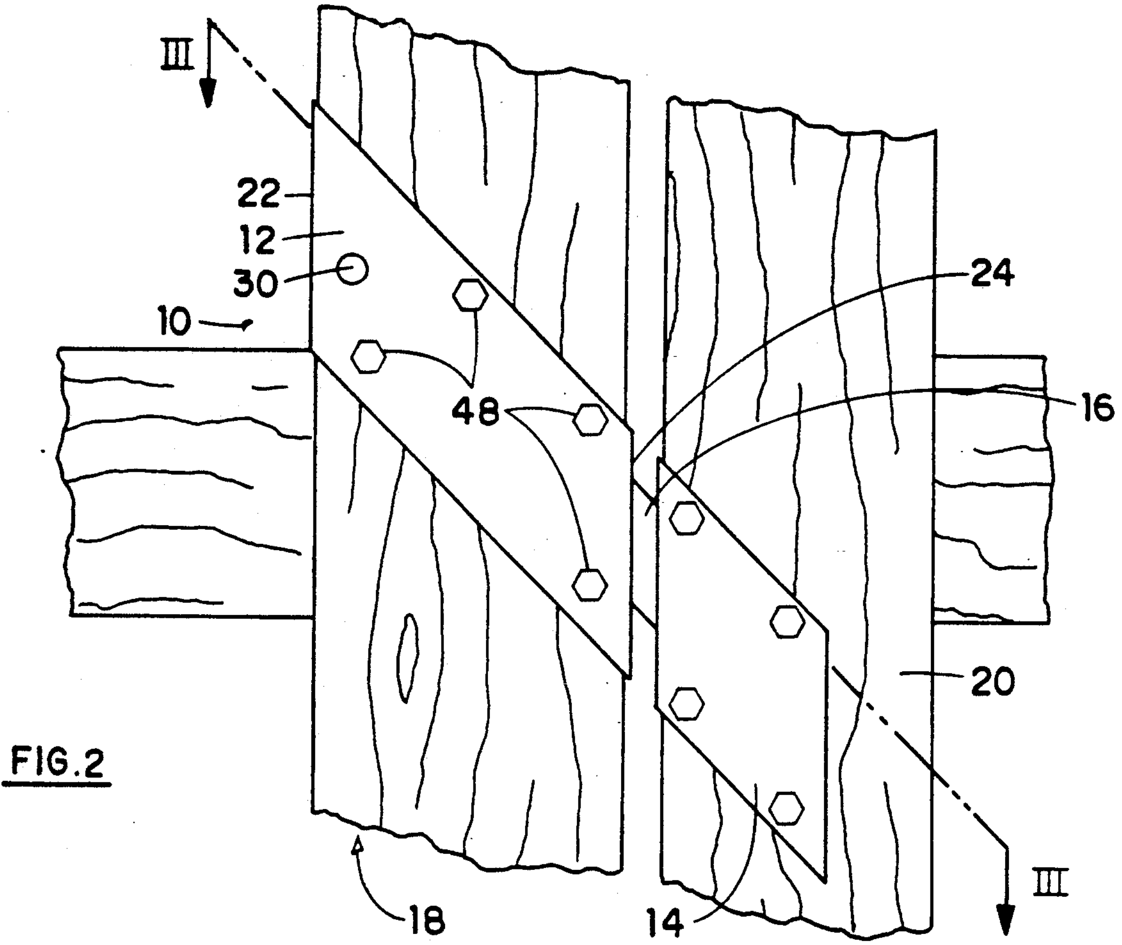
FIG. 2 is an elevation of the latch mounted on a wooden corral gate.
Figure 3:
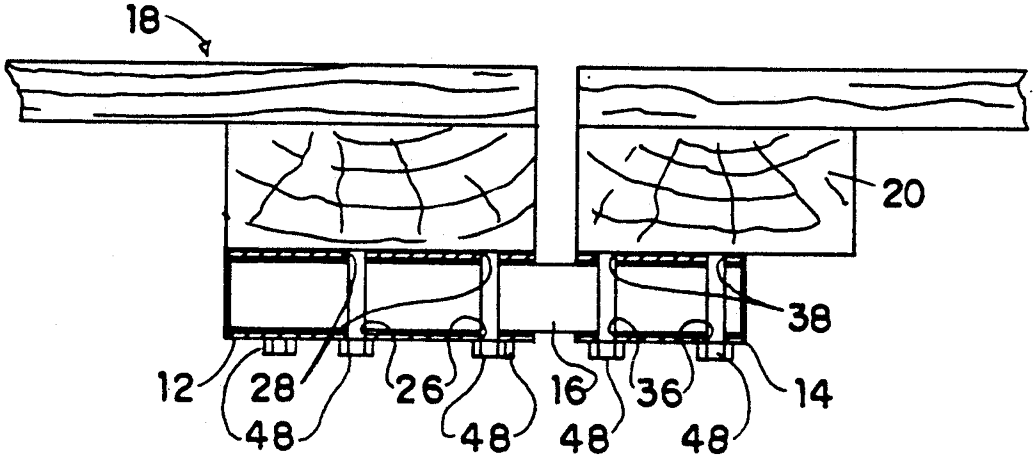
FIG. 3 is a sectional view along the line III—III of FIG. 2.

Referring to the accompanying drawings, especially to FIG. 1, there is illustrated a gate latch 10 consisting of three metal tubular components. These include a barrel 12, a keeper 14 and a bolt 16. The barrel and keeper have rectangular sections of the same configuration, while the bolt is square and dimensioned to the slide within the barrel and keeper. As illustrated in FIGS. 2 and 3, the barrel is mounted on a gate 18, in this case a wooden corral gate, while the keeper 14 is mounted on a gate post 20 adjacent the free edge of the gate.

The two ends 22 and 24 of the barrel are mitred at 45°. The two ends are parallel and, in the installed state, lie parallel to the free edge of the gate 18, as illustrated most particularly in FIG. 2. In consequence, the barrel itself inclines downwardly towards the edge of the gate at an angle on 45°. The barrel has four fastener holes 26 formed in its outer face. These are paired with four fastener holes 28 in the rear face as illustrated most particularly in FIG. 3. The pairs of holes are arranged in two, spaced apart, parallel rows with the spacing between the rows being greater than the height of the bolt 16. A lock hole 30 is formed in the front face of the barrel adjacent the end of the barrel remote from the keeper 14.

The keeper 14 has two ends 32 and 34 that are mitred at 45° like the ends 22 and 24 of the barrel 12. In the installed state the keeper is aligned with the barrel with the confronting ends of the two parallel to one another, as most particularly illustrated in FIG. 2.

The keeper has a series of four fastener holes 36 formed in its front wall and a corresponding set of four fastener holes 38 formed in its rear face. The pairs of aligned holes 36 and 38 are arranged in rows aligned with the rows of fastener holes 26 and 28 in the barrel.

The bolt 16 has two ends 40 and 42 also mitred 45° to match the ends of the barrel and the keeper. At its upper end the front of the bolt has a lock hole 44 that corresponds with the lock hole 30 in the keeper. The bottom face of the bolt, adjacent the upper end is equipped with a stop 46 that projects from the bolt for limiting its travel along the keeper as will be described more fully in the following.

As illustrated in FIGS. 2 and 3 the barrel and keeper are fastened to the wooden corral gate 18 and the adjacent post or standard 20 by lag screws 48.

Figure 4:
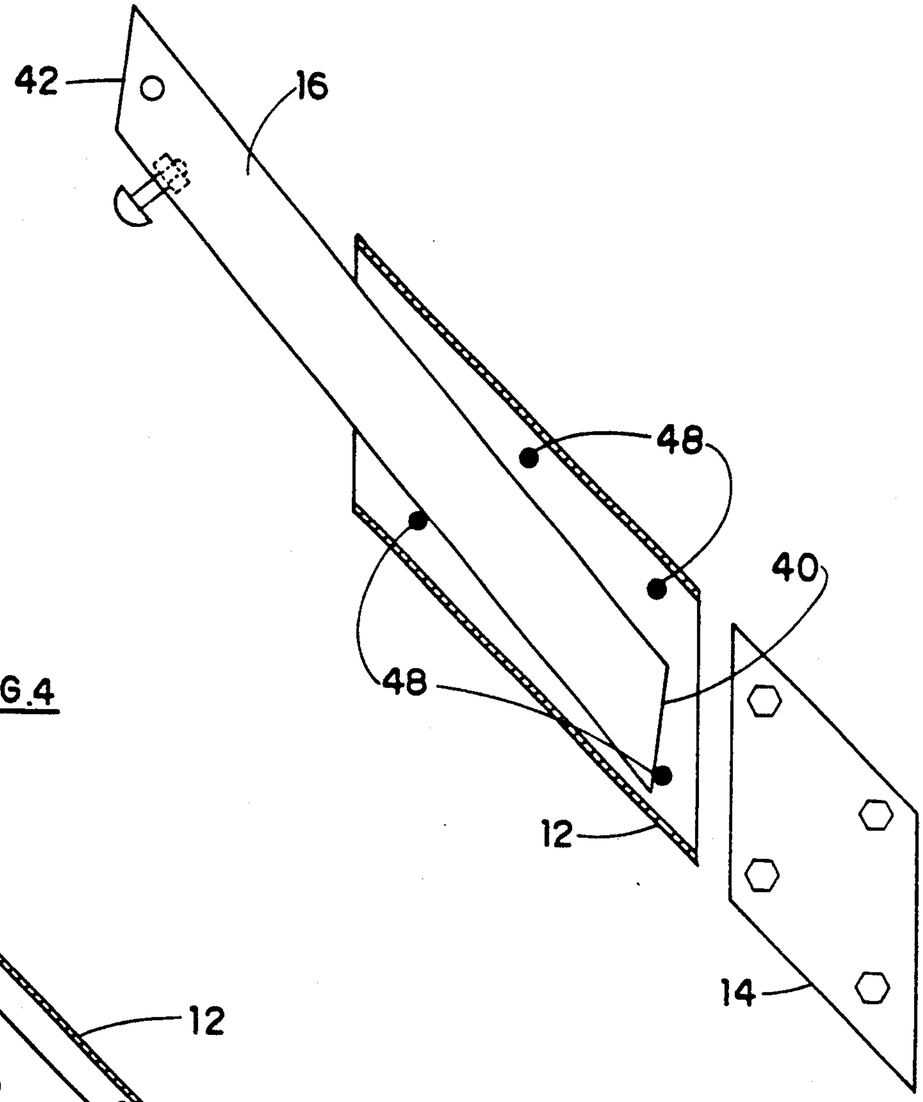
FIG. 4 is an elevation, part in section, showing the latch with the bolt retracted.
Figure 5:
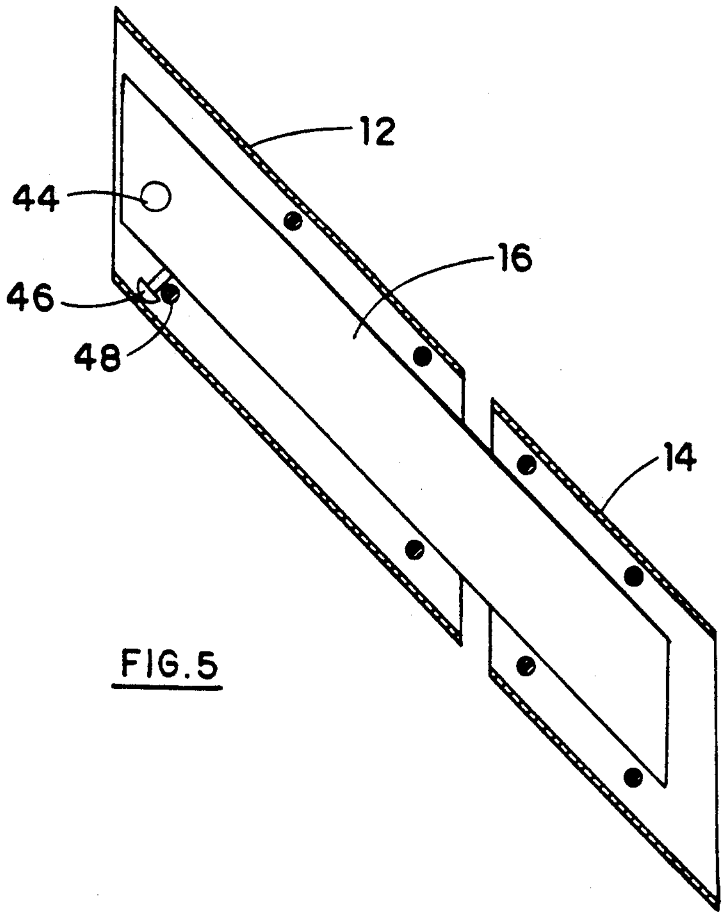
FIG. 5 is a view like FIG. 4 showing the bolt set.

As illustrated in FIGS. 4 and 5, the spacing between the lag screws is somewhat greater than the height of the bolt 16, so that the bolt can slide along the barrel 12 and keeper 14, between the two rows of lag screws. The bolt is supported in the barrel and the keeper by the lag screws.

As illustrated in FIG. 4, when the bolt 16 is withdrawn from the keeper 14, its end 40 may be engaged with one of the lag screws 48 by lifting the opposite end 42 where it projects from the barrel 12. This retains the bolt in an unlatched condition. When it is desired to set the bolt, it is simply necessary to release the bolt from the lag screw so that it will slide along the barrel under gravity until it reaches the condition illustrated in FIG. 5, where the bolt 16 is shown set, with the stop 46 engaged with a lag screw 48 in the barrel 12.

Figure 6:
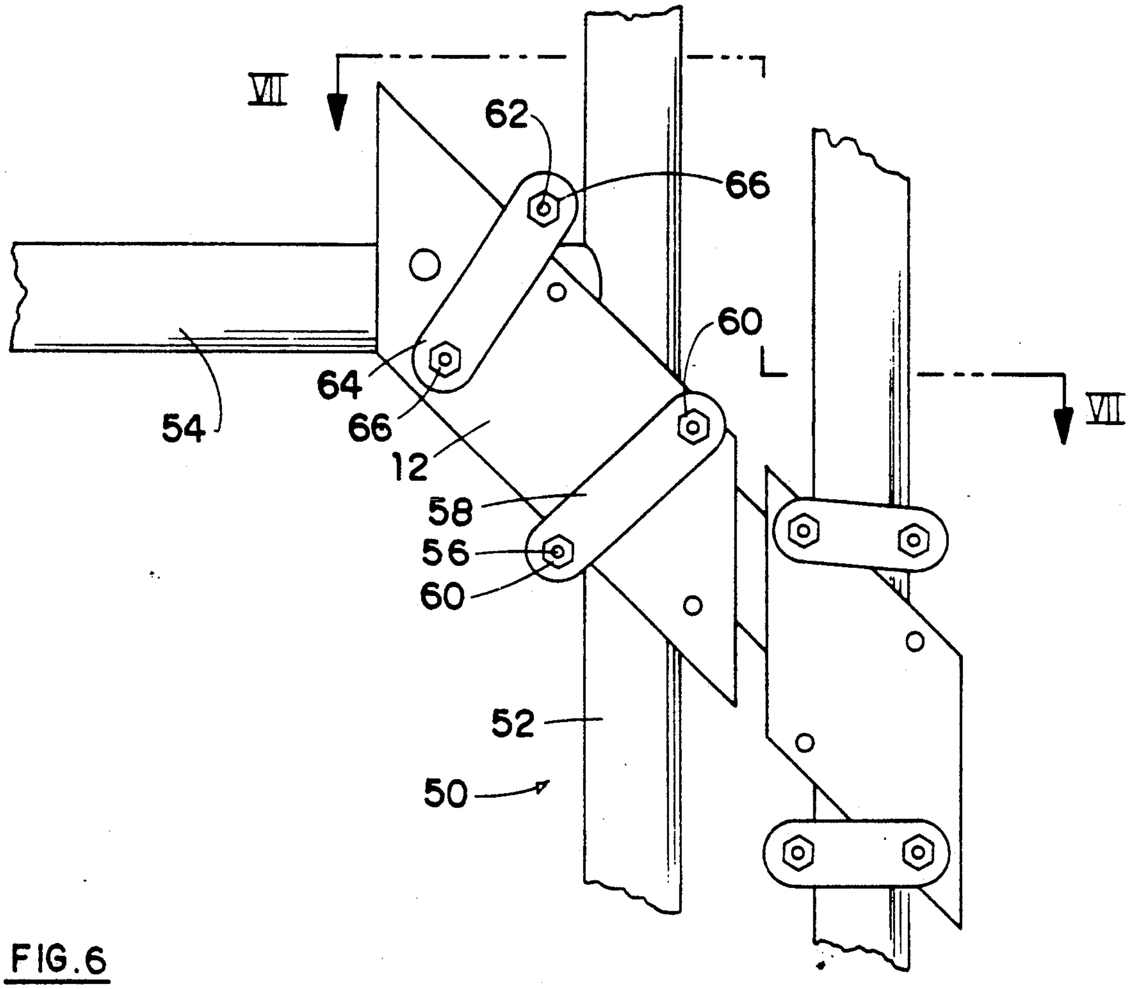
FIG. 6 is a front elevation of the latch mounted on a steel corral gate.
Figure 7:
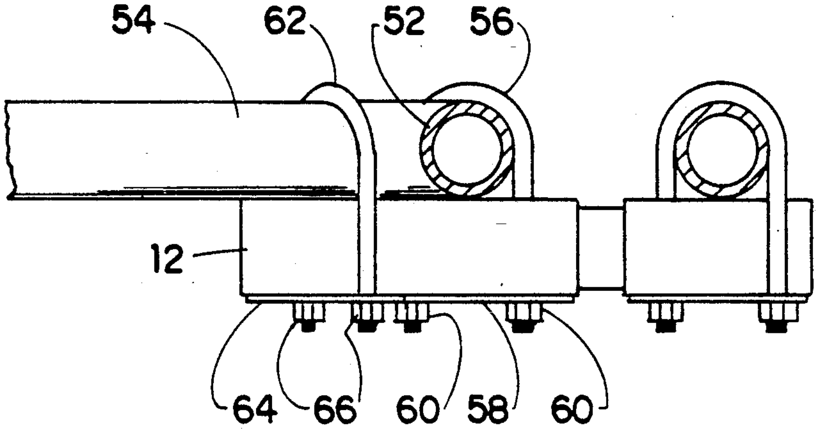
FIG. 7 is a view along line VII—VII of FIG. 6.

As illustrated most particularly in FIGS. 6 and 7, the latch is susceptable of being mounted on a steel corral gate 50 using alternative forms of fastener. The gate illustrated in the drawings has a round upright 52 and a round cross member 54. The barrel 12 is fastened to the upright 52 using a U-bolt 56 with one arm passing through one pair of aligned fastener holes 26 and 28 and the other arm positioned below the barrel, on the opposite side of the upright. A clamp plate 56 is engaged over the U-bolt arms and is secured in place using nuts 60. The barrel is likewise fastened to the cross-member 54 using a U-bolt 62 with one arm passing below the cross member and through a pair of aligned fastener holes 26 and 28. The other arm of the U-bolt passes over the cross member 54 and the barrel to the front of the barrel, where it is coupled to a plate 64 by nuts 66.

In the latched condition of the latch as illustrated in FIG. 5, the lock hole 44 in the bolt and the lock hole 30 in the barrel are in alignment so that the hasp of a padlock or the like can be passed through these holes and the lock engaged to lock the latch in its latched position.

While one particular embodiment of the present invention has been described in the foregoing, it is to be understood that other embodiments are possible within the scope of the invention. It is therefore to be understood that the invention to be considered limited solely by the scope of the apended claims.

We claim:

1. A gate latch comprising two tubular housings aligned end to end in a latched condition, each housing having a hollow interior and a plurality of pairs of fastener openings through the housing, with the fasteners of each pair aligned on opposite sides of the hollow interior, the fastener openings being arranged in two spaced apart rows extending along the housings, a plurality of fastener means extending through respective ones of the pairs of holes, a bolt slidable along the housings, the bolt having an overall length not greater than the combined lengths of the housings and a height less than the distance between the spaced apart rows of fasteners openings, and stop means projecting from one side of the bolt for engagement with one of the fastener means in the latched condition to limit sliding movement of the bolt.

2. A latch according to claim 1 wherein the housings are of rectangular cross-section.

3. A latch according to claim 2 wherein the bolt is of rectangular cross-section.

4. A latch according to claim 3 including at least four pairs of fastener holes in each housing.

5. A latch according to claim 3 in which the housings have confronting end faces oriented at an acute angle to the longitudinal extent of the housings.

6. A latch according to any one of claims 1 through 5 including a lock hole in one of the housings, adjacent an end thereof remote from the other housing, and a mating lock hole in the bolt.

7. A gravity lock for a swinging panel with a free edge lying adjacent a fixed standard in a closed position of the panel, the lock comprising a barrel mounted on the panel, a keeper mounted on the standard and a bolt slidable in the barrel and keeper between a latched position with the bolt linking the barrel and keeper and an unlatched position with the bolt retracted from the keeper, wherein the barrel and keeper are tubular members with hollow interiors and are mounted on the panel and the standard respectively with the barrel sloping downwardly to the free edge of the panel and the keeper aligned with the barrel, the adjacent ends of the barrel and keeper being mitred and substantially parallel to the free edge of the panel, fastener openings extending through the barrel and the keeper adjacent top and bottom edges thereof, fasteners extending through at least some of the fastener openings and through the hollow interiors of the barrel and keeper for securing the barrel and keeper to the panel and standard respectively, and a stop projecting from the bolt for engagement with one of the fasteners to limit the travel of the bolt in the latched position.

8. A lock according to claim 7 wherein the barrel and keeper comprise rectangular tubes.

9. A lock according to claim 8 wherein the bolt comprises a rectangular tube.

10. A lock according to claim 7 wherein the fastener openings are arranged in two substantially parallel rows.

11. A lock according to claim 10 wherein the bolt has a height less than the spacing between the rows of fastener openings.

12. A lock according to claim 7 wherein the ends of the bolt are mitred and substantially parallel to the adjacent ends of the barrel and the keeper.

13. A lock according to claim 12 wherein the ends of the barrel and keeper opposite the adjacent ends thereof are mitred and substantially parallel to the adjacent ends thereof.

14. A lock according to any one of claims 7 through 13 including a lock opening in the barrel adjacent the end thereof remote from the keeper, and a complimentary lock opening in the bolt adjacent the corresponding end thereof.

* * * * *